Dec. 16, 1969  S. MUSICAN  3,483,818
DEVICE FOR MARKING A PLURALITY OF PLIES OF MATERIAL
Filed April 17, 1967  3 Sheets-Sheet 1

INVENTOR.
SOLOMON MUSICAN
BY
Caesar, Rivise,
Bernstein & Cohen
ATTORNEYS.

Dec. 16, 1969  S. MUSICAN  3,483,818
DEVICE FOR MARKING A PLURALITY OF PLIES OF MATERIAL
Filed April 17, 1967  3 Sheets-Sheet 2

INVENTOR.
SOLOMON MUSICAN
BY
Caesar, Rivise,
Bernstein & Cohen
ATTORNEYS.

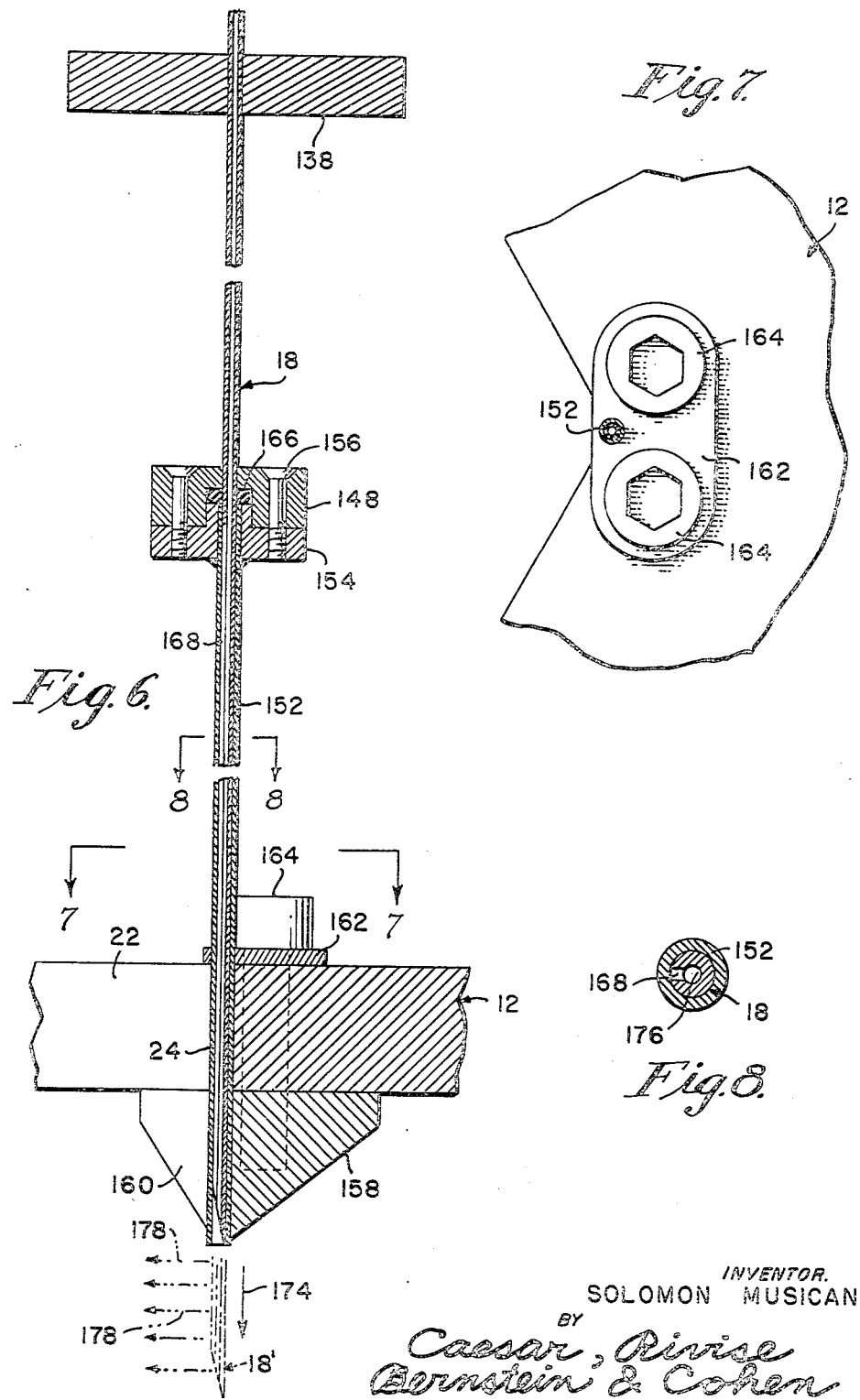

United States Patent Office 3,483,818
Patented Dec. 16, 1969

3,483,818
DEVICE FOR MARKING A PLURALITY OF
PLIES OF MATERIAL
Solomon Musican, Philadelphia, Pa., assignor to Hol-Mark Machine Corporation, Park City West, Philadelphia, Pa., a corporation of Pennsylvania
Filed Apr. 17, 1967, Ser. No. 631,231
Int. Cl. B44d 1/09
U.S. Cl. 101—26                                    8 Claims

ABSTRACT OF THE DISCLOSURE

A device for the simultaneous marking of a plurality of plies of fabric including a reciprocable support for an aerosol can, an aerosol can containing a suspension of marking material, and a slotted needle for penetrating the plies of fabric and depositing the marking material in a small spot onto the fabric. The improvement resides in providing a relief hole for excess powder in the needle and a trap for the excess powder to prevent the same from being sprayed into the atomsphere.

---

This invention relates to a device for marking a plurality of plies of material, and more particularly, to a device which is a modification of and improvement on the device disclosed and claimed in my prior United States Patent No. 3,292,529.

In the garment industry, fabric is assembled in many layers and in one cutting a manufacturer cuts a number of identical sections according to a pre-determined pattern. It is necessary to mark each of these sections in order to conform them to the pattern and to indicate where certain details of the final garment will be located. Thus, such details as buttons, button holes and pleats must be marked on each of the sections which was cut to the given pattern.

In the past many devices have been used which had as their purpose the simultaneous marking of each section or ply in a plurality of plies. One of the first used methods for marking a plurality of sections was to physically drill a hole through all of the sections or plies cut to a given pattern. However, the drilling suffered from a number of disadvantages. One of the primary disadvantages was that after the hole was cut it was necessary for the tailor to hold each ply up to the light to determine where the hole was drilled. This was obviously a time-consuming job and severely cut down the efficiency of the operation. Furthermore, in loosely knit materials, drilling was totally ineffective since no permanent hole was left.

An improvement on this method was arrived at by using a drill having cutting teeth at its tip. Thus the hole could be made wider than that which was accomplished by the previous drills. It has been found, however, that although this method was satisfactory for woven fabrics it could not be used on knit fabrics in view of the fact that the cutting would break the knit strands and could ultimately damage the knit fabric. Furthermore, on bulky knit fabrics it was still very difficult to find the location of the drilled hole.

Another method used in the prior art consisted of passing a needle through a plurality of plies of the cut sections. This needle would have a central bore and an opening at its lower tip. In use, chalk powder would be blown through the needle and out the tip, and this powder would leave a mark on the fabric. This method suffered from the disadvantage that it was inexact in that there was no certainty that each ply would be contacted by the powder as the needle was either pushed down or withdrawn. Furthermore, the loose powder could be brushed away inadvertently and therefore the mark could not be found when it was necessary to carry out further tailoring operations such as the placement of buttons, button holes and pleats.

All of the difficulties of the prior art methods were overcome by the device disclosed and claimed in my prior Patent No. 3,292,529. That device utilized a chalk suspension which included a liquid carrier. The chalk suspension was propelled from an aerosol can through a slotted needle which was inserted into the plies of fabric. The valve on the aerosol can used with my prior device has been modified to include a hole which serves as a means for dispensing the chalk suspension from the aerosol can and as a relief hole for any excess powder which is not deposited on the plies of fabric. Thus, when the powder suspension is discharged from the aerosol can through the needle, because of the compact of the plies of fabric, to be marked, not all of the suspension within the needle is deposited on the fabric. The excess suspension remains in the needle under pressure. The suspension under pressure is then blown through the relief hole on the stem of the aerosol valve, and in turn can be blown into the atmosphere. It was found that the blown-back suspension created quite a problem for the operator of the marking device and therefore the prior device was modified to include a means for capturing the excess powder without passing the same into the atmosphere.

It is therefore an object of this invention to provide an improve device for marking a plurality of plies of material.

It is another object of this invention to provide a device for marking a plurality of plies of material that includes a means for retaining excess marking material which is not deposited on the plies of material.

These and other objects of this invention are accomplished by providing a device for marking a plurality of plies of material comprising a support, means supporting an aerosol can associated with said support, said aerosol can supporting means being longitudinally movable with respect to said support, a needle associated with the discharge valve of said aerosol can, said needle having a central bore and an elongated slot extending along a subs:antial length of the outer surface of said needle, said slot being in communication with said bore, and means in communication with said bore for retaining excess marking material which passes through said discharge valve but is not deposited on said plies of material.

Other objects and many of the attendant advantages of this invention will be readily appreciated as the same becomes better understood by reference to the following detailed description when considered in connection with the accompanying drawing wherein:

FIG. 6 is an enlarged sectional view taken along the line 6—6 of FIG. 1;

FIG. 7 is a sectional view taken along the line 7—7 of FIG. 6; and

FIG. 8 is an enlarged sectional view taken along the line 8—8 of FIG. 6.

Figure 1:
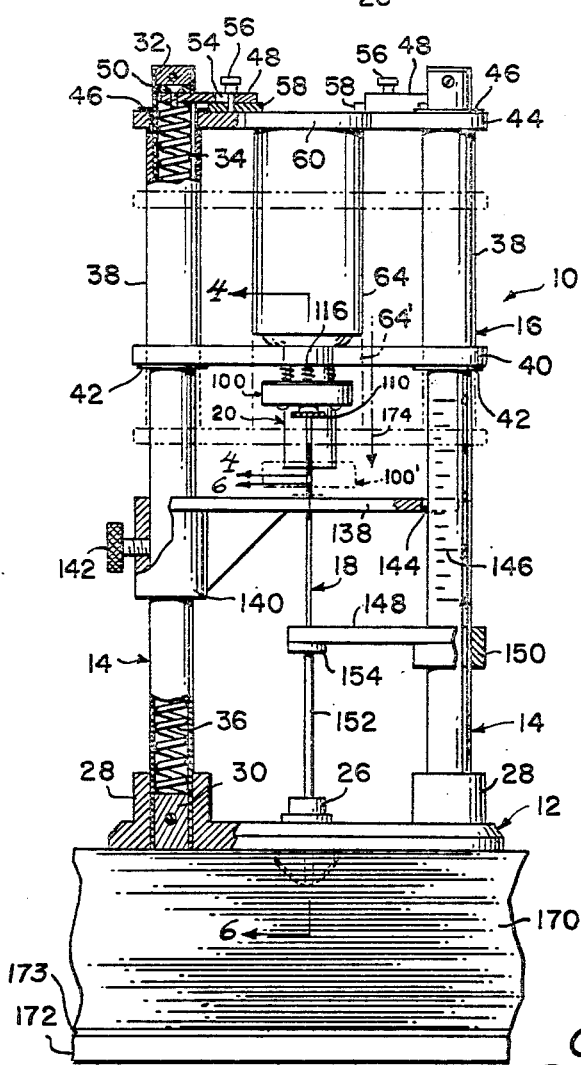
FIG. 1 is a front elevational view, partly broken away, of the device of this invention.

Referring now in greater detail to the various figures of the drawing wherein similar reference characters refer to similar parts, an improved device for marking a plurality of plies of material is generally shown at 10 in FIG. 1. Device 10 basically comprises a base 12, a pair of supporting shafts 14 mounted on the base, an aerosol can holder 16 slidably mounted on shafts 14, a needle 18 connected to the valve of an aerosol can, and a powder trap 20.

Figure 3:
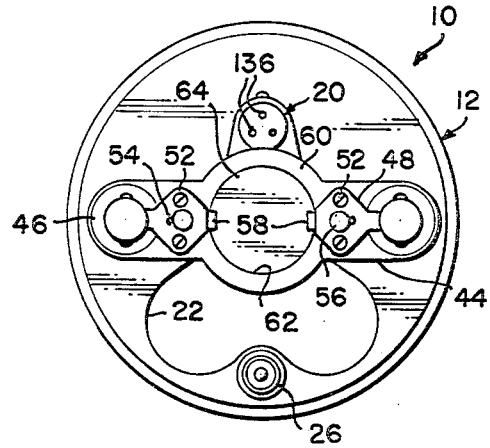
FIG. 3 is a top plan view of the device of FIG. 1.
Figure 2:
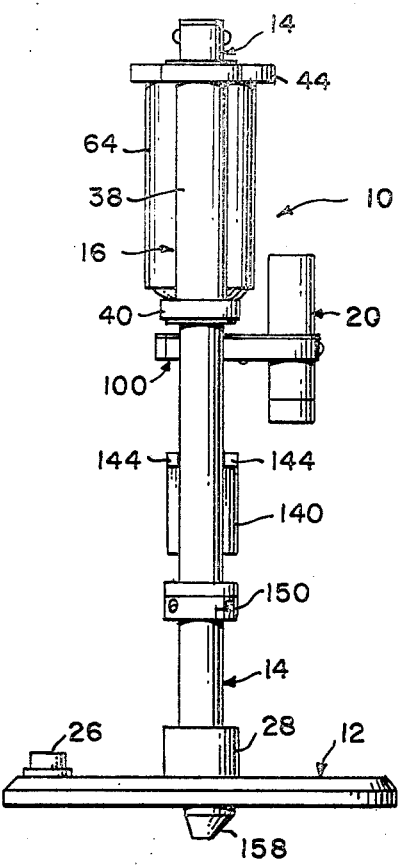
FIG. 2 is a side elevational view of the device of FIG. 1.

As best seen in FIGS. 1 to 3, base 12 is basically circular and includes an opening 22 which passes therethrough. Opening 22 is substantially heart shaped and includes a vertex 24 (FIG. 6) which is in alignment with needle 18. A spirit level 26 is positioned along the outer perimeter of base 12 and is aligned with the vertex 24. A pair of integral upstanding bosses 28 flank a pair of aligned holes in the base, as best seen in FIG. 1. The lower ends of shafts 14 are secured in bosses 28.

Shafts 14 are hollow, but include plugs 30 and 32 at their ends. Each shaft 14 includes a vertically extending slot 34 along its inner wall, with the slots being opposed to each other. A coiled compression spring 36 is positioned in each shaft 14.

Can holder 16 includes a pair of tubes 38 which are telescoped over the upper portion of shafts 14. Tubes 38 are secured to horizontal plate 40 by any conventional means, such as welding. Bushings 42, which can be nylon or other low coefficient of friction material, are positioned in the lower ends of tubes 38 and slidably contact tubes 14. Tubes 38 are secured at their tops to a second horizontal plate 44. Bushings 46 are positioned in the tops of tubes 38.

Fingers 48 are secured to disc 50 (FIG. 1) within shafts 14. The fingers project outwardly from the shafts 14 through slots 34. The discs 50 and the associated fingers 48 are vertically movable within shafts 14 under the urging of springs 36. Fingers 48 are secured to plate 44 by screws 52, as seen in FIG. 3. Fingers 48 each include a longitudinally extendng slot 54. A thumb screw 56 passes through slot 54 and is threadedly engaged in a tab 58, which is slidably mounted in a recess in the bottom of each finger.

As best seen in FIG. 3, plate 44 includes an enlarged central portion 60 which includes a circular opening 62. The opening 62 is of a diameter sufficient to permit an aerosol can 64 to be placed therein. In order to insert the aerosol can, thumb screws 56 are rotated in order to permit tabs 58 to slide freely in a longitudinal path along slots 54. This permits the movement of the tabs 58 back from opening 62. Thereafter, aerosol can 64 is dropped in place in an inverted position with the valve end resting in plate 40. The tabs 58 are then returned to the position shown in FIGS. 1 and 3 and thumb screws 56 are tightened. This draws the tabs 58 against the underside of fingers 48 and prevents any further movement of the tabs. In this way, the aerosol can 64 is locked in place.

Figure 4:
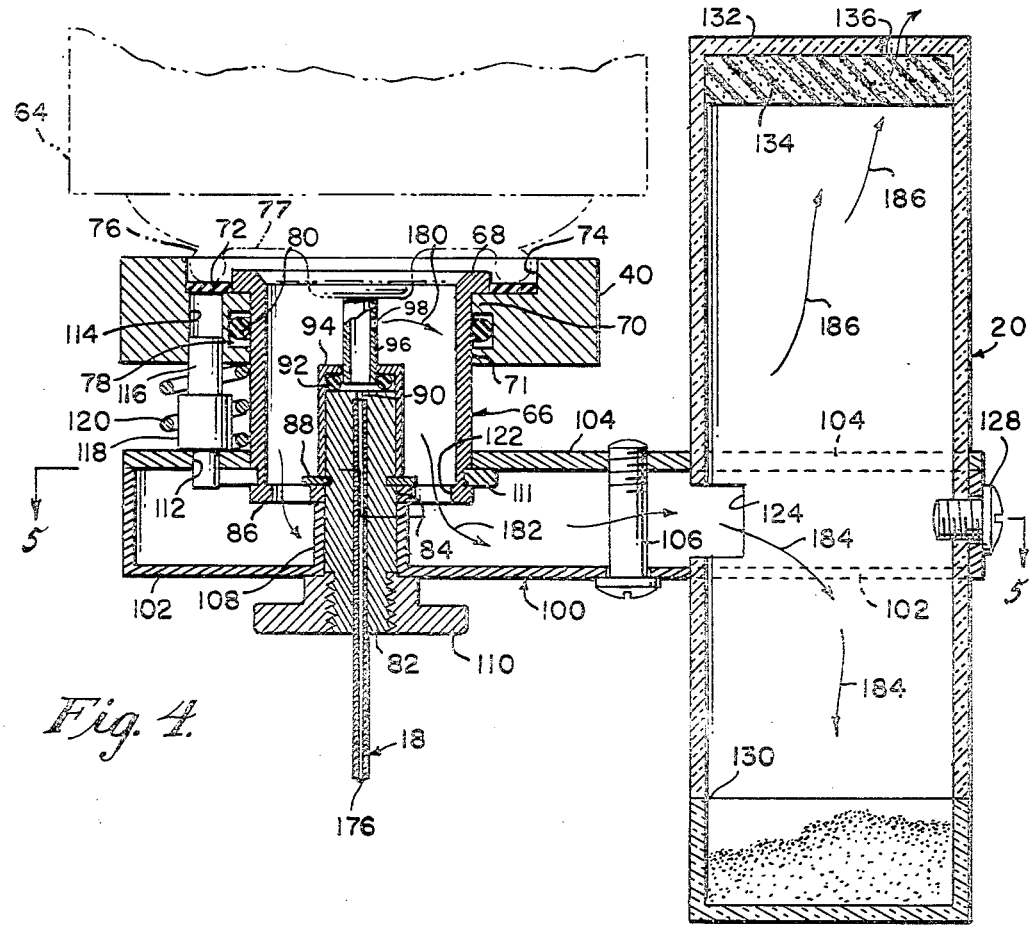
FIG. 4 is an enlarged sectional view taken along the line 4—4 of FIG. 1.
Figure 5:
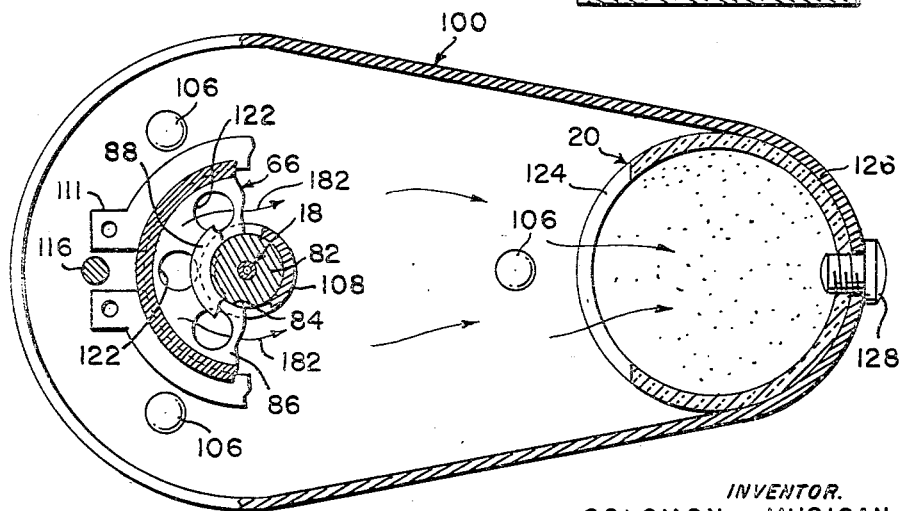
FIG. 5 is a sectional view taken along the line 5—5 of FIG. 4.

As best seen in FIGS. 4 and 5, the inverted aerosol can has its top positioned in needle housing 66 when the can is in the operative position. Needle housing 66 is cup-shaped and includes an upper annular outwardly projecting flange 68 which rests on the lip 70 of a circular central opening 71 in plate 40. Needle housing 66 can be secured in place by any conventional means such as welding. An annular gasket 72 is positioned in recess 74 of plate 40, and is adapted to receive bead 76 of aerosol can 64. An annular recess 77 is formed adjacent bead 76, which is conventional in aerosol cans. An annular groove 78 is formed adjacent opening 71 in plate 40 and includes an O-ring 80.

An adaptor plug 82 passes through a central opening 84 in the bottom wall 86 of needle housing 66. A split ring 88 is received in an annular groove of plug 82 and aids in holding the plug in place. Plug 82 includes a central bore 90 which receives needle 18. The needle is held in place within the bore by a pressed fit. An O-ring 92 rests on the top of plug 82 and is covered by cap 94 which is secured to the plug 82 by a pressed fit. As seen in FIG. 4, the lower edge of cap 94 rests on split ring 88. Stem 96 of the aerosol can 94 passes through a central opening in cap 94 and is received in O-ring 92. Stem 96 includes a hole 98 in its side wall for a purpose to be described hereinafter.

A powder duct 100 connects needle housing 66 with trap 20. Duct 100 comprises an elongated trough 102 (FIG. 5) having a cover plate 104 which is secured in place by the three screws 106 (FIG. 5). Trough 102 includes an opening surrounded by an upstanding annular wall 108. Plug 82 passes through wall 108 and frictionally engages the same. The top edge of wall 108 abuts the bottom surface of wall 86 of needle housing 66. A thumb nut 110 is threadedly engaged on the bottom exterior surface of plug 102, and the top edge of thumb nut 110 engages the bottom wall of trough 102. A split ring 111 is received in an annular groove in needle housing 66 and abuts the undersurface of cover plate 104. It is thus seen in FIG. 4 that duct 100 is held rigidly in place by the abutment of wall 108 against wall 86 and thumb nut 110, and the abutment of cover plate 104 against split ring 111.

Cover plate 104 is provided with three equally spaced holes 112 (one shown in FIG. 4) which are positioned around the exterior surface of needle housing 66. Three equally spaced holes 114 (one shown in FIG. 4) are formed in plate 40 and are aligned with holes 112. A guide pin 116 having an intermediate shoulder 118 connects each hole 114 with its associated hole 112. Pins 116 are free to reciprocate vertically within holes 112 and 114. A coiled compression spring 120 is telescoped over each pin 116 and abuts plate 40 and cover plate 104.

The bottom 86 of needle housing 66 is provided with a plurality of equally spaced holes 122 (FIG. 5). These holes connect the interior of needle housing 66 with the interior of powder duct 100. Powder duct 100 is in turn connected with the interior of trap 20 through opening 124 formed in the trap. As seen in FIG. 5, trap 20 is basically circular in cross-section and is secured to the rounded end 126 of duct 100 by screw 128. Trap 20 is molded from a transparent plastic, such as polystyrene, and includes a conventional parting line 130 which is formed in the molding operation. The top 132 of the trap has secured thereto a flexible plastic foam filter 134. The foam filter can be of any porous plastic, such as polyurethane foam. A plurality of holes 136 (one shown in FIG. 4) is formed in the top 132 of the trap 20.

Referring again to FIG. 1 it is seen the device also includes a horizontal plate 138 which projects from a collar 140 which is telescoped over one of the shafts 14. Collar 140 can be releasably secured in place at any height along the shaft 14 by the tightening of thumb screw 142. Plate 138 is bifurcated at the side opposite collar 140, as shown at 144 in FIG. 2. The fingers formed by bifurcation 144 are on opposite sides of shaft 14, which includes calibrations 146 engraved in the surface thereof. Needle 18 passes through a central opening in plate 138.

Plate 148 is secured to a shaft 14 by collar 150. As best seen in FIGS. 6, 7 and 8, a vertically extending tube 152 is welded to a collar 154, which is in turn threadedly secured to plate 148, as seen at 156. Tube 152 passes through base 12 at vertex 24 of opening 22 and terminates at the lower edge of boss 158. Boss 158 is basically circular in cross section but includes a V-shaped slot 160 which is aligned with vertex 24. As seen in FIG. 7, tube 152 passes through a hole in plate 162 secured to base 12. A pair of bolts 164 passes through base 12 and threadedly secures boss 158 in plate (FIG. 6).

Tube 152 is impervious along its entire length and has an internal diameter slightly larger than the external diameter of needle 18. Needle 18 passes through plate 148 and into tube 152 in collar 154. An O-ring 166 serves as a seal where the needle joins with tube 152. As seen in FIGS. 6 and 8, needle 18 includes a vertically extending slot 168 which extends for substantially the entire length of the needle within tube 152.

The device of this invention is used in a manner substantially identical to the device disclosed and claimed in my prior Patent No. 3,292,529. The device is placed over a plurality of plies of material 170 (FIG. 1) which rests on a horizontal surface such as table 172. A pierceable material 173 is placed between the plies and the table. Material 173 can be cardboard or a rigid foam.

The uppermost ply of material is marked to indicate the exact location where a mark is desired for each of the plies of the material. Thereafter, the device is placed over the plies 170 and the exact location of the desired mark can be determined by aligning the mark on the uppermost ply with the vertex 24. The boss 158 aids in compacting all of the plies in the area where the mark will be made. Boss 158 is used primarily on compressible materials, such as loose knits, where relatively uncompressible materials such as cotton gabardine, are used, the boss can be eliminated. With the device in place the total height of the plies of fabric is measured. Thereafter, plate 138 is adjusted to have the calibration 146 over the upper surface of plate 138 equal to the measured height of the plies of fabric. The calibrations 146 can be made to take into account any compactness caused by boss 158.

Once the necessary adjustment has been made the device is used by grasping tubes 38 which serve the dual function of acting as handles for the device and as vertical guide means for the reciprocating motion of aerosol can 64. The tubes 38 are pushed downward in the direction of arrow 174 (FIG. 1). This causes needle 18 to project below boss 158 to the position shown at 18' in FIG. 6. Downward motion is continued until nut 110 abuts plate 138. As viewed in FIG. 4, an upward pressure against nut 110, caused by the abutment against plate 138, causes the top surface of adapter plug 82 to abut the top of stem 96 of aerosol can 64. The vertical alignment of the trap 20 and its associated duct 100 is maintained during this operation by the three guide pins 116. Continued pressure against stem 96 causes the stem to enter the top of aerosol can 64. At the same time, flange 68 of needle housing 66 moves upwardly into recess 77. When hole 98 in stem 96 enters the aerosol can, a liquid suspension of powder within the can passes through hole 98 and into stem 96. Shoulders 118 prevent the stem 96 from being pushed completely into aerosol can 64, thereby preventing any damage to the aerosol valve which includes stem 96.

The chalk or powder suspension discharged from can 64 passes through stem 96 and into the bore 176 (FIG. 4) of needle 18. The chalk continues through the needle and is discharged from the slot 168 in the needle into the plies of fabric, as shown by arrows 178 in FIG. 6. The position of the aerosol can during this discharging operation is shown at 64' in FIG. 1. All of the chalk suspension which is discharged from needle 18 will pass into the plies of fabric and deposit a small white mark. Any part of the slotted portion of the needle which is not in the plies of fabric will be within the impervious tube 152, and the tube will prevent any discharge from the needle. It is thus seen that the tube serves the dual function of preventing an inadvertent expulsion of chalk suspension and of maintaining the longitudinal movement of the needle when the device is used.

After a short discharge from the aerosol can, each of the plies of fabric 170 will be marked with the white chalk suspension. The aerosol can is then returned to the position shown in FIG. 1 by releasing the pressure on tubes 38 and permitting the can to be raised by the urging of springs 36 against fingers 48 (FIG. 1). As soon as the pressure on the handles is released, the spring actuated valve on the aerosol can is immediately closed. This is accomplished by the urging of spring 120 against cover plate 104 (FIG. 4). This in turn causes the cover plate to bear against split ring 111 thereby immediately separating the valve stem 96 from the top of adaptor plug 82, thus permitting instantaneous closing of the aerosol valve.

One of the problems solved by the improved device of this invention is the fact that there is a pressure build-up of the pressurized chalk suspension within needle 18 during the operation of the device. Thus, it has been found that there is a maximum amount of chalk suspension that can be propelled through slot 168 into the plies of fabric. Any excess chalk suspension which has been discharged from aerosol can 64 remains under pressure in the bore of needle 18. When the aerosol valve is closed, the hole 98 which permitted the chalk suspension to leave the aerosol can will again be in the position shown in FIG. 4. Any excess chalk suspension which is under pressure within needle 18 can then escape through hole 98 into needle housing 66 as shown by arrow 180 in FIG. 4. Thereafter the excess suspension will pass through holes 122 in bottom 86 of the needle housing into powder duct 100 as shown by arrows 182. The powder proceeds through opening 124 in trap 20 and is deposited in the bottom of the trap as shown by arrows 184. The excess pressure in the system is released through holes 136 in the top of the trap as shown by arrows 186 (FIG. 4). Filter 134 prevents any powder entrained in the air passing through holes 136 from leaving the trap 20. Thus, foam filter 134 is air pervious but is impervious to any solid particles entrained in the air. In actual usage, however, the overwhelming bulk of the solid powder will be deposited in the bottom of trap 20.

Since trap 20 is molded from a transparent plastic, it is relatively easy to determine when it must be emptied. When emptying is necessary, screw 128 is removed, the trap can be slid through the opening in duct 100 by lifting it vertically upward and the powder in the trap can be dumped through opening 124. Thereafter the trap can be replaced in the position shown in FIG. 4.

As explained in greater detail in my prior Patent No. 3,292,529, the device of this invention can be used for marking fabric for any of the many purposes in which fabric was previously marked. Thus, it can be used for locating the positions for stitching in order to form pleats in a skirt pattern or for locating buttons and button holes in a pattern.

The marking material in aerosol can 64 is a suspension of finely ground powder such as chalk. The specific ingredients of the suspension are disclosed in detail in co-pending application Ser. No. 497,436, filed Oct. 18, 1965, now abandoned. Basically, the suspension comprises a marking material, such as finely powdered chalk, a lubricant, a dispersing or suspending agent and a propellant.

When can 64 is empty it is easily removed by loosening thumb screws 56 and sliding tabs 58 outwardly (FIG. 1). Can 64 can then be lifted vertically upward and replaced by dropping a new can in place. Tabs 58 are returned to the position shown in FIG. 1 and are secured in place by tightening thumb screws 56. The device will once again be ready for use and no further adjustment need be made on the aerosol can.

It is to be understood that means other than hole 98 in stem 96 can be used to provide a relief hole for excess powder under pressure in the bore of needle 18. Thus, all that is required is that the relief hole be closed when the valve in the aerosol can 64 is open and that the relief hole be open when the valve in the aerosol can is closed. For instance, the relief hole can be provided through needle 18, plug 82 and cap 94. A slidable gate can be used to automatically close the hole when the valve is open with the gate being automatically removed from the hole when the valve is closed. Any other suitable means can be provided to place trap 20 in communication with the bore of the needle.

Without further elaboration, the foregoing will so fully illustrate my invention, that others may, by applying current or future knowledge, adopt the same for use under various conditions of service.

What is claimed as the invention is:

1. A device for marking a plurality of plies of material comprising a support, means supporting an aerosol can associated with said support, said aerosol can supporting means being longitudinally movable with respect to said support, a needle associated with the discharge valve of said aerosol can, said needle having a central bore and an elongated slot extending along a substantial length of the outer surface of said needle, said slot being in communication with said bore, and means in communication with said bore for retaining excess marking material which passes through said discharge valve but is not deposited on said plies of material through said slot, said retaining means comprising a duct in communication with said bore and a trap in communication with said duct, said trap having a portion thereof perforated to place the interior of said trap in communication with the atmosphere around said marking device, and gas pervious, but solid impervious, means covering said perforations, whereby said excess marking material passes through said duct and into said trap, and whereby gas may pass through said perforations but the marking material will be retained in said trap by said gas pervious means.

2. The device of claim 1 wherein at least a portion of said trap is transparent whereby the amount of excess marking material within said trap can be viewed from the exterior of said trap.

3. The marking device of claim 1 wherein said trap is releasably secured to said duct and may be removed from said duct for emptying.

4. The device of claim 1 wherein said support comprises a base and a pair of shafts projecting vertically upward from said base, and spring means associated with said shafts, said spring means adapted to urge said aerosol can supporting means longitudinally.

5. The device of claim 1 and additionally including means for releasably holding an aerosol can within said aerosol can supporting means.

6. A device for marking a plurality of plies of material comprising a support, means supporting an aerosol can associated with said support, said aerosol can supporting means being longitudinally movable with respect to said support, a needle associated with the discharge valve of said aerosol can, said needle having a central bore and an elongated slot extending along a substantial length of the outer surface of said needle, said slot being in communication with said bore, and means in communication with said bore for retaining excess marking material which passes through said discharge valve but is not deposited on said plies of material through said slot, said aerosol can being adapted to be placed in said supporting means in an inverted position, with said discharge valve lowermost when said can is in said inverted position, said discharge valve having a stem projecting exteriorly of said can, said stem having a central bore which is adapted to be placed in communication with the bore of said needle, and said stem having a lateral opening which is in communication with the bore of said stem, whereby said excess marking material passes through the bore of said needle, the bore of said stem and out through the opening in said stem.

7. The device of claim 6 and further including means supporting the upper end of said needle, with the lower end of said stem adapted to contact said supporting means, housing means containing said supporting means and said stem, said housing means being in communication with said means for retaining said excess marking material.

8. A device for marking a plurality of plies of material comprising a support, means supporting an aerosol can associated with said support, said aerosol can supporting means being longitudinally movable with respect to said support, said support comprising a base and a pair of shafts projecting vertically upward from said base, first spring means associated with said shafts, said first spring means adapted to urge said aerosol can supporting means longitudinally, second spring means associated with abutment means for discharging the material from said aerosol can, with said aerosol can having a spring actuated discharge valve, said second spring means adapted to immediately close said discharge valve by aiding in urging said aerosol can supporting means away from said abutment means, a needle associated with the discharge valve of said aerosol can, said needle having a central bore and an elongated slot extending along a substantial length of the outer surface of said needle, said slot being in communication with said bore, and means in communication with said bore for retaining excess marking material which passes through said discharge valve but is not deposited on said plies of material through said slot.

References Cited

UNITED STATES PATENTS

| 3,306,189 | 2/1967 | Alcamo | 101—26 |
| 3,292,529 | 12/1966 | Musican | 101—26 |
| 3,257,151 | 6/1966 | Sprackling | 55—417 XR |
| 2,935,232 | 5/1960 | Thomas | 222—162 |
| 2,892,510 | 6/1959 | Wygant | 55—417 |
| 2,718,989 | 9/1955 | Day et al. | 141—121 XR |
| 2,401,124 | 5/1946 | Walker et al. | 141—115 XR |
| 1,802,228 | 4/1931 | Witte | 55—319 |

ROBERT E. PULFREY, Primary Examiner

CLIFFORD D. CROWDER, Assistant Examiner

U.S. Cl. X.R.

55—319; 141—121